(12) United States Patent
Hannemann et al.

(10) Patent No.: US 8,356,621 B2
(45) Date of Patent: Jan. 22, 2013

(54) DEVICE AND METHOD FOR EXTENDING THE SERVICE LIFE OF FIRING INSTALLATIONS

(75) Inventors: Frank Hannemann, Buckendorf (DE); Berthold Köstlin, Duisburg (DE); Rainer Nies, Uttenreuth (DE)

(73) Assignee: Siemens Aktiengesellschaft, München (DE)

( * ) Notice: Subject to any disclaimer, the term of this patent is extended or adjusted under 35 U.S.C. 154(b) by 899 days.

(21) Appl. No.: 12/311,836

(22) PCT Filed: Oct. 5, 2007

(86) PCT No.: PCT/EP2007/060577
§ 371 (c)(1),
(2), (4) Date: Apr. 14, 2009

(87) PCT Pub. No.: WO2008/046747
PCT Pub. Date: Apr. 24, 2008

(65) Prior Publication Data
US 2010/0186643 A1    Jul. 29, 2010

(30) Foreign Application Priority Data
Oct. 16, 2006 (EP) .................................. 06021673

(51) Int. Cl.
*B08B 17/00* (2006.01)
*B08B 5/00* (2006.01)
*F23J 3/00* (2006.01)

(52) U.S. Cl. .............. 137/237; 55/435; 55/524; 95/285; 110/203; 110/345

(58) Field of Classification Search ............ 55/435, 55/436, 524, DIG. 14, DIG. 24; 95/285; 137/237; 110/203, 345
See application file for complete search history.

(56) References Cited

U.S. PATENT DOCUMENTS

| | | | |
|---|---|---|---|
| 5,185,217 A | 2/1993 | Miyamoto et al. | |
| 6,755,016 B2 * | 6/2004 | Dittler et al. .................... | 60/297 |
| 2004/0172951 A1 | 9/2004 | Hannemann et al. | |
| 2006/0093736 A1 | 5/2006 | Raybould et al. | |

FOREIGN PATENT DOCUMENTS

| | | |
|---|---|---|
| DE | 3537479 A1 | 4/1987 |
| DE | 3739197 A1 | 6/1988 |
| EP | 0416954 A1 | 3/1991 |
| RU | 2104327 C1 | 10/1998 |
| RU | 61843 U1 | 3/2007 |
| WO | WO 03008768 | 1/2003 |

OTHER PUBLICATIONS

Communication from Gorodissky & Partners, Aug. 24, 2011, pp. 1-2, 1-4.

* cited by examiner

*Primary Examiner* — Robert Clemente

(57) ABSTRACT

A device for increasing service life of a combustion installation is disclosed. The combustion installation has a gas-conducting component and a conducted gas has dirt particles. The gas-conducting component has a layer which is partially detached together with the dirt particles of the gas when the layer is impinged with the gas and when a dirt particle is deposited on the layer.

8 Claims, 2 Drawing Sheets

DEVICE AND METHOD FOR EXTENDING THE SERVICE LIFE OF FIRING INSTALLATIONS

CROSS REFERENCE TO RELATED APPLICATIONS

This application is the US National Stage of International Application No. PCT/EP2007/060577 filed Oct. 5, 2007 and claims the benefit thereof. The International Application claims the benefits of European Patent Application No. 06021673.6 EP filed Oct. 16, 2006, both of the applications are incorporated by reference herein in their entirety.

FIELD OF INVENTION

The invention relates to a device for extending the service life of firing installations including at least one gas-ducting component. The gas therein has dirt constituents. The invention relates further to a method for extending the service life of firing installations.

BACKGROUND OF INVENTION

A multiplicity of power stations have been built throughout the world over the past decade that are based on a combined gas/steam turbine process and by means of which the noxious discharge can be significantly reduced. Said stations are referred to as combined gas and steam power stations.

In the case of a sub-type of combined gas and steam power stations—what are termed IGCC power stations ("IGCC" being an acronym of "Integrated Gasification Combined Cycle")—the combined gas and steam power station additionally has an integrated fuel gasification unit by means of which a liquid fuel—for example oil—or a solid fuel—for example a mineral—, brown coal, or biomass—is converted in a gasifier into a synthesis gas which is then combusted in a gas turbine. The synthesis gas is as a rule cleaned before being combusted. Viewed overall, noxious substances are in that way separated off even before combustion takes place, or are not produced at all.

Oxygen is required for gasifying the fuels to produce synthesis gas. For producing the oxygen, IGCC power stations have air separation units in which, besides the necessary oxygen, mainly nitrogen is produced from the ambient air through fractional distillation. The synthesis gas has to be cooled prior to further treatment. During the cooling process steam is produced which, among other things, contributes to generating current in the steam turbine of the IGCC power station. Filters first keep back ash particles when the gas has been cooled, then carbon dioxide can also be removed if required. Other noxious substances such as sulfur compounds and heavy metals are bound likewise by means of chemical and physical processes. The necessary fuel purity for operating the gas turbines and low emissions from the IGCC power station are realized thereby.

Upstream of the combustion chamber of the gas turbine the synthesis gas is if necessary mixed with nitrogen from the air separation unit and/or with water vapor in order to condition the fuel-gas mixture in accordance with the gas turbine's requirements. The working gas then produced from combusting with air is expanded in the turbine stages of the gas turbine.

The exhaust gas is released to the atmosphere once the working gas has been expanded in the gas turbine and the waste heat has then been utilized in a steam generator.

The streams of steam from the crude- and waste-gas cooling process are combined and jointly fed to the steam turbine. After being expanded in the steam turbine, the steam is condensed via a condenser and the condensate fed back via the feed-water container into the water cycle or, as the case may be, steam cycle.

An IGCC plant of said type is known from, for example, WO 03/008768. Said plant has a gasification device in which particulate coal is combusted together with oxygen and steam to produce a synthesis gas (partial oxidation). After several processing steps the synthesis gas is fed as a gaseous fuel to a gas turbine combustion chamber.

SUMMARY OF INVENTION

What, though, is problematic therein is that the dirt constituents such as, for instance, smallish ash particles adhere as deposits to the gas-ducting conduits and to arrangements located therein such as filters and valves or valve-like devices. The gas can also contain gaseous (metallic) compounds, for example iron and nickel carbonyls, which through reacting with metal elements likewise cause deposits to form on the components. That causes an iron or nickel-carbonyl coating to form on burner components, which would make cyclical cleaning necessary and hence significantly adversely affect the availability of the IGCC power station.

Said deposits have to be removed and the components cleaned or even replaced prior to the actual scheduled plant maintenance. The plant needs to be shut down for that purpose, resulting in enormous costs.

An object of the invention is hence to disclose a device for extending the service life of firing installations, in particular synthesis gas plants, with the installation including gas-ducting components and the gas having dirt constituents. A further object is to disclose a method for extending the service life of firing installations.

The device-specific object is achieved by means of a device disclosed for extending the service life of firing installations including at least one gas-ducting component, with the ducted gas having dirt constituents and the at least one gas-ducting component having a layer which, when the gas is applied against it, can with a dirt constituent deposited on it be detached together partially at least with the dirt constituent by the gas stream itself.

The invention proceeds from the fact that the dirt constituents settle onto a component and cannot be detached even by the gas flowing past. The invention has therefore recognized that the components need to be suitably coated. The invention has further recognized that a detachable coating will achieve the object. That is because if a dirt constituent is deposited on the thus coated components, a part of the coating will be detached by the gas stream along with the dirt constituent. The gas-ducting component will hence remain deposit- and dirt-free for much longer. Thus the plant will not need to be shut down prematurely in order to remove the deposits, meaning that fault-free operation can be maintained. The operating time of a plant of said type will be significantly extended thereby.

The dirt constituents are preferably solid particles. They can principally be the ash particles produced in the IGCC plant.

In a preferred embodiment the dirt constituent forms owing to a gaseous compound in the gas that results from a chemical reaction with the gas-ducting component and causes a deposit to form on its surface. That is because the gas contains likewise gaseous (metallic) compounds, for example iron and nickel carbonyls, which by reacting with, for example, metal elements likewise cause a deposit to form.

The detachable layer preferably has a crystallographic structure amenable to detaching when the gas is applied against it.

The structure is in particular suitable for detaching.

The detachable layer preferably contains bornite. Bornitride does not when exposed to temperature (up to 1200° C.) react with carbon monoxide. That makes it especially suitable as a surface coating. That is because it is heat-resistant as well as oxidation resistant up to 1000° C. It is also because it is unwettable by molten metals. It is relatively inexpensive, moreover. Dirt constituents and other impurities deposited on the bornitride can, owing to the graphite structure, be detached by the flowing gas itself along with the bornitride layer.

In a preferred embodiment the detachable layer is applied to the gas-ducting component using a spray-on technique. That is especially advantageous because it has proved particularly simple to spray the layer on. Small holes in the component can furthermore also be coated in that way largely without any problems. Another advantage is that a substantially even layer thickness can be produced using a spray-on technique.

The at least one gas-ducting component is preferably a perforated plate. The device cited herein lends itself particularly well to gas-ducting perforated plates having a number of holes because a particularly large number of dirt constituents can adhere there and so significantly disrupt the fuel flow.

What are preferably to be treated are components regarded as critical in terms of resublimating noxious substances in gaseous compounds—components such as, for example, gas-ducting burner components on whose metallic surfaces iron and/or nickel carbonyls are deposited as solids and which require cyclical cleaning.

The firing installation is embodied preferably as a synthesis gas burner. Synthesis gas installations such as, for example, coal- and gas-fired installations are characterized in particular by a large number of dirt constituents, in particular ash particles and deposits resulting from a chemical reaction. The device is therefore especially suited to said installations.

The method-specific object is achieved by means of a method for extending the service life of firing installations including at least one gas-ducting component, with the ducted gas having dirt constituents, so that the gas is applied against the coated component, dirt constituents are deposited on the layer, and the dirt constituents are detached together partially at least with the layer by the gas stream itself.

All the advantages associated with achieving the device-specific object can also be applied to the method.

Further features and advantages will emerge from the further claims and the description of the figures.

BRIEF DESCRIPTION OF THE DRAWINGS

The invention is described in more detail below by way of example with reference to a drawing, in which in simplified representations and not to scale.

DETAILED DESCRIPTION OF INVENTION

Figure 1:
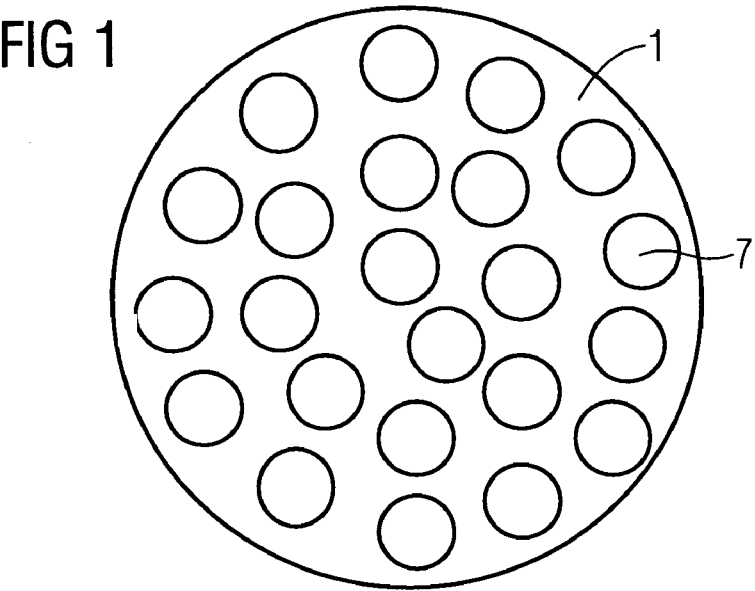
FIG. 1 shows a perforated plate having no dirt constituents.

FIG. 1 shows by way of example a perforated plate 1 embodied as a gas-ducting element as can be employed in an IGCC power station or in other coal- and gas-fired or, as the case may be, synthesis gas power stations. The gas supply system is here embodied having a perforated plate 1 with holes 7 for obtaining an even fuel influx. FIG. 1 therein shows a perforated plate 1 that has no deposits or dirt adhering to it.

Figure 2:
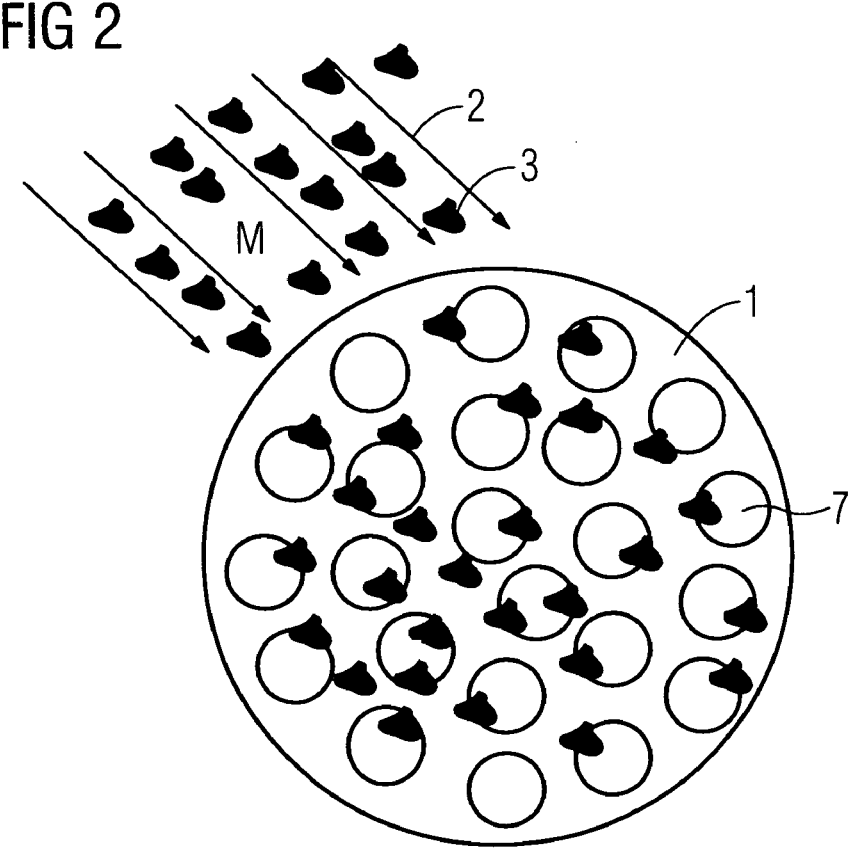
FIG. 2 shows a perforated plate having dirt constituents.

FIG. 2 shows the mass flow M of the fuel having dirt constituents 3 represented here in the form of, for instance, ash particles 3 in the direction of flow 2 of the fuel. Said particles adhere to the perforated plate 1, thereby blocking the holes 7. The result is an uneven fuel gas flow. A smooth combusting process is hence no longer possible. The plant must consequently be shut down and the perforated plate 1 cleaned or replaced. That results in enormous costs.

Figure 3:
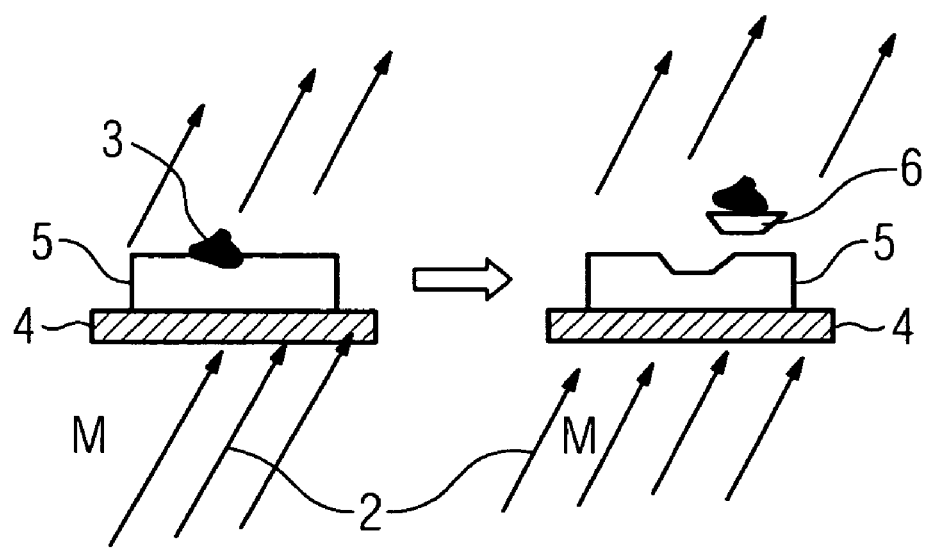
FIG. 3 shows a device and method for extending the service life of firing installations.

FIG. 3 shows the device and the method. A detachable layer 5 is sprayed onto a gas-ducting component 4 (a section of which is shown here), for example the perforated plate 1, gas-ducting pipes, or valves. The detachable layer 5 is therein preferably a hexagonal bornitride layer. A substantially even layer thickness is achieved by spraying. The dirt constituent 3 in the mass flow M then adheres to the layer. The deposited dirt constituent 3 will thereafter, owing to the detachability of the layer 5, release itself under the impact of the mass flow (gas stream) in the direction of flow 2, along with a part 6 of the layer itself, meaning during operation. The gas-ducting component 4 will therefore remain deposit- and dirt-free significantly longer. That will ensure an even fuel flow or, as the case may be, mass flow M. A premature plant shutdown will be obviated thereby. The gas-ducting components can therein be pipes, valves, perforated plates, burner components, or the burner itself.

The invention claimed is:

1. A device for extending service life of a firing installation, comprising:
    a gas-ducting component; and
    a gas stream having dirt particles, the gas stream being ducted via the gas-ducting component,
    wherein the gas-ducting component has a layer which is at least partially detachable together with a dirt particle deposited on the layer when the gas stream is applied to the layer, and wherein the layer is detachable by the gas stream itself,
    wherein the gas-ducting component is a perforated plate having a plurality of holes, and
    wherein the detachable layer contains bornite.

2. The device as claimed in claim 1, wherein the detachable layer is made of bornite.

3. The device as claimed in claim 1, wherein the detachable layer is applied to the gas-ducting component by using a spray-on technique.

4. The device as claimed in claim 1, wherein the detachable layer has a crystallographic structure that is amenable to detaching when the gas stream is applied to it.

5. The device as claimed in claim 1, wherein the detachable layer has a thickness between 10 µm and 100 µm.

6. The device as claimed in claim 1, wherein the detachable layer has a thickness between 20 µm and 60 µm.

7. A firing installation embodied as a synthesis gas burner having a device for extending service life of a firing installation, comprising:
    a gas-ducting component; and
    a gas stream having dirt particles, the gas stream being ducted via the gas-ducting component,
    wherein the gas-ducting component has a layer which is at least partially detachable together with a dirt particle deposited on the layer when the gas stream is applied to the layer, and wherein the layer is detachable by the gas stream itself, wherein the gas-ducting component is a perforated plate having a plurality of holes, and
wherein the detachable layer contains bornite.

8. A method for extending service life of a firing installation with a gas-ducting component and with a gas stream having dirt particles ducted via the gas-ducting component, comprising:
 providing a gas-ducting component which is a perforated plate having a plurality of holes;
 applying a gas stream to the gas-ducting component;
 depositing dirt particles on a layer of the gas-ducting component; and
 detaching at least partially the dirt particles together with the layer by the gas stream itself,
 wherein the layer contains bornite.

* * * * *